United States Patent
Asami et al.

(10) Patent No.: US 9,580,071 B2
(45) Date of Patent: Feb. 28, 2017

(54) HYBRID VEHICLE AND CONTROL METHOD FOR THE SAME

(71) Applicant: TOYOTA JIDOSHA KABUSHIKI KAISHA, Toyota-shi, Aichi-ken (JP)

(72) Inventors: Takayuki Asami, Toyota (JP); Masashi Yoshimi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/733,001

(22) Filed: Jun. 8, 2015

(65) Prior Publication Data

US 2015/0353077 A1 Dec. 10, 2015

(30) Foreign Application Priority Data

Jun. 10, 2014 (JP) ................. 2014-119482

(51) Int. Cl.
*B60W 20/00* (2016.01)
*B60W 10/08* (2006.01)
(Continued)

(52) U.S. Cl.
CPC ............ *B60W 20/50* (2013.01); *B60W 10/06* (2013.01); *B60W 10/08* (2013.01); *B60W 10/30* (2013.01); *B60W 20/106* (2013.01); *B60W 20/13* (2016.01); *B60W 2510/0614* (2013.01); *B60W 2510/244* (2013.01); *B60W 2540/10* (2013.01);
(Continued)

(58) Field of Classification Search
CPC .... B60W 20/50; B60W 10/06; B60W 20/106; B60W 10/08; B60W 10/30; B60W 2510/0614; B60W 2710/06; B60W 2710/08; Y10S 903/93
See application file for complete search history.

(56) References Cited

U.S. PATENT DOCUMENTS

2003/0101947 A1   6/2003  Ries-Mueller
2011/0307134 A1  12/2011  Yoshimi
(Continued)

FOREIGN PATENT DOCUMENTS

JP        3117797 B2     10/2000
JP    2003-531334 A     10/2003
(Continued)

*Primary Examiner* — Redhwan k Mawari
*Assistant Examiner* — Rodney P King
(74) *Attorney, Agent, or Firm* — Finnegan, Henderson, Farabow, Garrett & Dunner, LLP

(57) ABSTRACT

A hybrid vehicle includes an internal combustion engine, an electric power storage device, an electric motor, a shutter, and an electronic control unit. The shutter is configured to introduce air into an engine compartment of the hybrid vehicle from outside the hybrid vehicle during traveling of the hybrid vehicle in a state where the shutter is open. The electronic control unit is configured to control the internal combustion engine, the electric motor and the shutter. The electronic control unit is configured to control the hybrid vehicle such that starting of the internal combustion engine is more suppressed in a case where the shutter is in a malfunctioning state than in a case where the shutter is not in the malfunctioning state. The malfunctioning state is a state where an opening degree of the shutter does not reach a predetermined opening degree.

10 Claims, 9 Drawing Sheets

(51) Int. Cl.
*B60W 10/30* (2006.01)
*B60W 10/06* (2006.01)

(52) U.S. Cl.
CPC ..... *B60W 2710/06* (2013.01); *B60W 2710/08* (2013.01); *B60W 2710/305* (2013.01); *Y10S 903/93* (2013.01)

(56) References Cited

U.S. PATENT DOCUMENTS

2013/0103265 A1\* 4/2013 Remy ................ B60K 11/085
 701/49
2015/0314779 A1 11/2015 Nagakura et al.

FOREIGN PATENT DOCUMENTS

| JP | 2008-012963 A | 1/2008 |
| JP | 2008-296619 A | 12/2008 |
| JP | 2009-185700 A | 8/2009 |
| JP | 2011-98596 | 5/2011 |
| JP | 2011-229284 | 11/2011 |
| JP | 2011229284 A \* | 11/2011 |
| JP | 2012-001043 A | 1/2012 |
| JP | 2014-043805 A | 3/2014 |

\* cited by examiner

HYBRID VEHICLE AND CONTROL METHOD FOR THE SAME

INCORPORATION BY REFERENCE

The disclosure of Japanese Patent Application No. 2014-119482 filed on Jun. 10, 2014 including the specification, drawings and abstract is incorporated herein by reference in its entirety.

BACKGROUND OF THE INVENTION

1. Field of the Invention

The invention relates to a hybrid vehicle and a control method for the same and, more particularly, to a hybrid vehicle that is provided with a shutter and a control method for the same.

2. Description of Related Art

A shutter, which is disposed in a front grille in the front of a vehicle, is used to adjust the amount of air outside the vehicle which is introduced into the vehicle during the traveling and to adjust the cooling capacity of devices such as the engine in the engine compartment. When the shutter is in a closed state, the amount of the air that is introduced into the vehicle is decreased, and thus air resistance is reduced. When the shutter is in the closed state, a reduction in the temperature of the engine is suppressed while the engine is stopped, and thus the amount of fuel consumption for engine warm-up is reduced. In this manner, fuel economy can be improved by appropriately controlling the opening and closing of the shutter.

In addition, a configuration has been proposed in which the shutter is controlled in accordance with the temperature of the engine so as to ensure that the engine is kept within an appropriate temperature range. For example, Japanese Patent Application Publication No. 2011-98596 discloses a hybrid car in which the shutter is controlled so as to regulate the flow of air between the inside of the engine compartment and the outside of the car when the engine temperature is lower than a predetermined reference temperature.

SUMMARY OF THE INVENTION

In some cases, a malfunctioning state of the shutter arises and air cannot be introduced into the vehicle from the outside of the vehicle due to a factor such as the vibration, impact, or the like that occurs during the traveling of the vehicle. When the malfunctioning state occurs, the temperature of the engine becomes more likely to rise. As a result, the engine may reach an overheated state.

The invention provides a technique for preventing an excessive rise in the temperature of an engine in a case where a malfunctioning state occurs in a shutter of a hybrid vehicle that is provided with the shutter.

A hybrid vehicle according to an aspect of the invention includes an internal combustion engine, an electric power storage device, an electric motor, a shutter, and an electronic control unit. The electric motor is configured to generate driving force by electric power stored in the electric power storage device. The shutter is configured to be capable of being opened and closed. The shutter is configured to introduce air into an engine compartment of the hybrid vehicle from outside the hybrid vehicle during traveling of the hybrid vehicle in a state where the shutter is open. The electronic control unit is configured to control the internal combustion engine, the electric motor and the shutter. The electronic control unit is configured to control the hybrid vehicle such that starting of the internal combustion engine is more suppressed in a case where the shutter is in a malfunctioning state than in a case where the shutter is not in the malfunctioning state. The malfunctioning state is a state where an opening degree of the shutter does not reach a predetermined opening degree.

According to the configuration, the starting of the internal combustion engine is suppressed in a case where the shutter is in the malfunctioning state compared to a case where the shutter is not in the malfunctioning state. In other words, traveling (EV traveling) based on the electric motor in a state where the internal combustion engine is stopped becomes more likely to be performed. Accordingly, a rise in the temperature of the internal combustion engine can be suppressed and an excessive rise in the temperature of the internal combustion engine can be prevented.

The electronic control unit may be configured to control the hybrid vehicle such that traveling by the electric motor is more likely to be performed in a case where the shutter is in the malfunctioning state than in a case where the shutter is not in the malfunctioning state.

The electronic control unit may be configured to control the hybrid vehicle such that EV traveling is more likely to be performed in a case where the shutter is in the malfunctioning state than in a case where the shutter is not in the malfunctioning state. During the EV traveling, the internal combustion engine is stopped.

The electronic control unit may be configured to calculate a required driving force of the hybrid vehicle based on a degree of accelerator opening. The electronic control unit may be configured to start the internal combustion engine in a case where the calculated required driving force exceeds a predetermined threshold. The required driving force with respect to the degree of accelerator opening in a case where the shutter is in the malfunctioning state is set to be smaller than the required driving force with respect to the degree of accelerator opening in a case where the shutter is not in the malfunctioning state. According to this configuration, the required driving force with respect to the same degree of accelerator opening is set to be smaller or the threshold of the required driving force for starting the internal combustion engine is set to be greater in a case where the malfunctioning state of the shutter has occurred than in a case where the malfunctioning state of the shutter has not occurred. Accordingly, the required driving force becomes less likely to exceed the threshold, and the starting of the internal combustion engine can be suppressed. As a result, a rise in the temperature of the internal combustion engine can be suppressed and an excessive rise in the temperature of the internal combustion engine can be prevented.

The electronic control unit may be configured to calculate a required driving force of the hybrid vehicle based on a degree of accelerator opening. The electronic control unit may be configured to start the internal combustion engine in a case where the calculated required driving force of the hybrid vehicle exceeds a predetermined threshold. The predetermined threshold is set to be larger in a case where the shutter is in the malfunctioning state than in a case where the shutter is not in the malfunctioning state. According to this configuration, the required driving force with respect to the same degree of accelerator opening is set to be smaller or the threshold of the required driving force for starting the internal combustion engine is set to be greater in a case where the malfunctioning state of the shutter has occurred than in a case where the malfunctioning state of the shutter has not occurred. Accordingly, the required driving force becomes less likely to exceed the threshold, and the starting of the internal combustion engine can be suppressed. As a result, a rise in the temperature of the internal combustion engine can be suppressed and an excessive rise in the temperature of the internal combustion engine can be prevented.

The hybrid vehicle may further includes an air-conditioner. The electronic control unit may be configured to control the air-conditioner such that driving of the air-conditioner is more limited in a case where the shutter is in the malfunctioning state than in a case where the shutter is not in the malfunctioning state. The air-conditioner may be configured to condition air in a passenger compartment of the hybrid vehicle by electric power stored in the electric power storage device. The air-conditioner may be configured to heat a passenger compartment of the hybrid vehicle by heat of the internal combustion engine.

Electric power is supplied from the electric power storage device to the air-conditioning device during the driving of the air-conditioning device, and thus the electric power that can be supplied from the electric power storage device to the electric motor is decreased by the same amount as the electric power that is supplied from the electric power storage device to the air-conditioning device. Accordingly, the driving force that can be output from the electric motor may be decreased. As a result, the internal combustion engine is started in a case where the driving force from the electric motor is short of the required driving force of the hybrid vehicle. As described above, the internal combustion engine becomes more likely to be started when the air-conditioning device is driven. According to the configuration described above, the driving of the air-conditioning device is limited in a case where the malfunctioning state of the shutter has occurred compared to a case where the malfunctioning state of the shutter has not occurred. Accordingly, the electric power that can be supplied from the electric power storage device to the electric motor increases and the driving force for the electric motor becomes more likely to be ensured, and thus the starting of the internal combustion engine can be suppressed. As a result, a rise in the temperature of the internal combustion engine can be suppressed and an excessive rise in the temperature of the internal combustion engine can be prevented.

The electronic control unit may be configured to switch a traveling mode. The traveling mode may include a charge depleting mode and a charge sustaining mode. The charge depleting mode is a mode in which a state of charge of the electric power storage device is consumed. The charge sustaining mode is a mode in which the state of charge is maintained at a predetermined value. The electronic control unit may be configured to control the hybrid vehicle such that switching of the traveling mode from the charge depleting mode to the charge sustaining mode is more suppressed in a case where the shutter is in the malfunctioning state than in a case where the shutter is not in the malfunctioning state.

According to the configuration described above, the switching of the traveling mode from the CD mode to the CS mode is suppressed in a case where the malfunctioning state of the shutter has occurred compared to a case where the malfunctioning state of the shutter has not occurred. More specifically, a threshold for switching the traveling mode from the CD mode to the CS mode is set to be smaller in a case where the malfunctioning state of the shutter has occurred than in a case where the malfunctioning state of the shutter has not occurred, and thus the period of traveling in the CD mode is extended. In the period of traveling in the CD mode, the starting of the internal combustion engine for the purpose of maintaining the SOC is not performed, and thus the starting of the internal combustion engine can be suppressed. As a result, a rise in the temperature of the internal combustion engine can be suppressed and an excessive rise in the temperature of the internal combustion engine can be prevented.

According to the invention, an excessive rise in the temperature of the engine pertaining to a case where the malfunctioning state of the shutter has occurred can be prevented in the hybrid vehicle that is provided with the shutter.

In a control method for a hybrid vehicle according to another aspect of the invention, the hybrid vehicle includes an internal combustion engine, an electric power storage device, an electric motor, and a shutter. The electric motor is configured to generate driving force by electric power stored in the electric power storage device. The shutter is configured to be capable of being opened and closed. The shutter is configured to introduce air into an engine compartment of the hybrid vehicle from outside the hybrid vehicle during traveling of the hybrid vehicle in a state where the shutter is open. The electronic control unit is configured to control the internal combustion engine, the electric motor and the shutter. The control method includes: determining, by the electronic control unit, whether an opening degree of the shutter reaches a predetermined opening degree; and suppressing, by the electronic control unit, starting of the internal combustion engine in a case where the shutter is in a malfunctioning state more than in a case where the shutter is not in the malfunctioning state, the malfunctioning state being a state where the opening degree of the shutter does not reach the predetermined opening degree.

According to the method described above, the starting of the internal combustion engine is suppressed in a case where the shutter is in the malfunctioning state compared to a case where the shutter is not in the malfunctioning state. In other words, traveling (EV traveling) based on the electric motor in a state where the internal combustion engine is stopped becomes more likely to be performed. Accordingly, a rise in the temperature of the internal combustion engine can be suppressed and an excessive rise in the temperature of the internal combustion engine can be prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
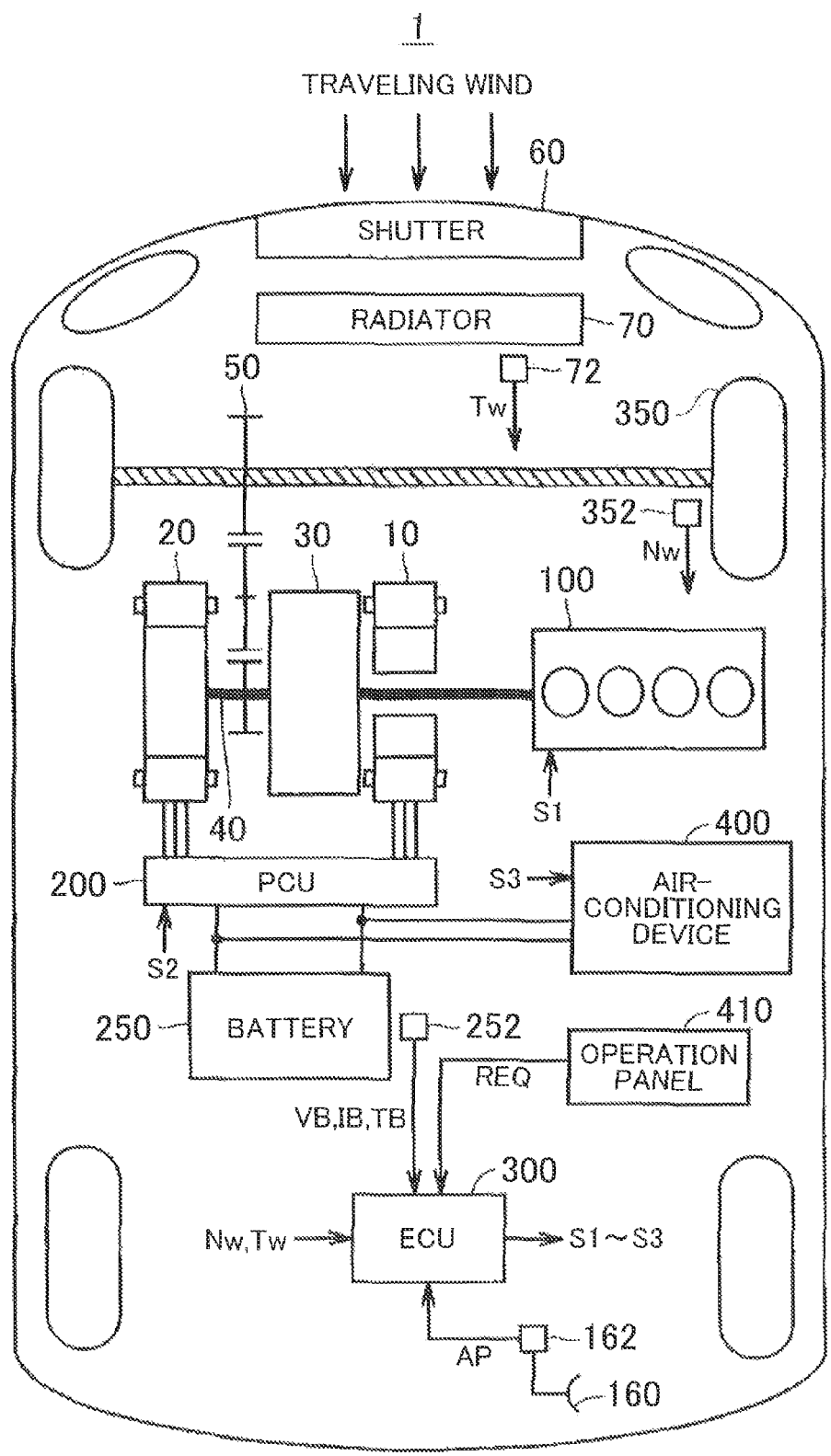
FIG. 1 is a block diagram schematically illustrating an overall configuration of a vehicle according to a first embodiment.

Hereinafter, embodiments of the invention will be described in detail with reference to accompanying drawings. Like reference numerals will be used to refer to like or corresponding parts in the drawings and description thereof will not be repeated.

First Embodiment

Configuration of Vehicle

FIG. 1 is a block diagram schematically illustrating an overall configuration of a vehicle according to a first embodiment. Referring to FIG. 1, a vehicle 1, which is a hybrid car, is provided with an engine 100, a first motor generator 10, a second motor generator 20, a power split mechanism 30, a drive shaft 40, a decelerator 50, a shutter 60, a radiator 70, a power control unit (PCU) 200, a battery 250, an electronic control unit (ECU) 300, and a driving wheel 350.

The engine 100 is an internal combustion engine such as a gasoline engine and a diesel engine. The engine 100 outputs a driving force, in response to a control signal S1 from the ECU 300, for the traveling of the vehicle 1.

Each of the first motor generator 10 and the second motor generator 20 is, for example, a three-phase AC rotary electric machine in which a permanent magnet is embedded in a rotor (none of which is illustrated herein). Each of the first motor generator 10 and the second motor generator 20 is driven by the PCU 200.

The first motor generator 10 is connected to a crankshaft (not illustrated) of the engine 100 via the power split mechanism 30. When the engine 100 is started, the first motor generator 10 rotates the crankshaft of the engine 100 by using the electric power of the battery 250. In addition, the first motor generator 10 can generate electric power by using the power of the engine 100. The AC electric power that is generated by the first motor generator 10 is converted into DC electric power by the PCU 200, and the battery 250 is charged therewith. In addition, the AC electric power that is generated by the first motor generator 10 is supplied to the second motor generator 20 in some cases.

The second motor generator 20 rotates the drive shaft 40 by using at least one of the electric power from the battery 250 and the electric power that is generated by the first motor generator 10. In addition, the second motor generator 20 can generate electric power by regenerative braking. The AC electric power that is generated by the second motor generator 20 is converted into DC electric power by the PCU 200, and the battery 250 is charged therewith.

The power split mechanism 30 is a power transmission device that mechanically connects the three elements of the crankshaft of the engine 100, a rotating shaft of the first motor generator 10, and the drive shaft 40. The power split mechanism 30 allows power to be transmitted between any two of the three elements by using the other one as a reaction force element.

The decelerator 50 transmits the power from the power split mechanism 30 or the second motor generator 20 to the driving wheel 350. In addition, a reaction force from a road surface that is received by the driving wheel 350 is transmitted to the second motor generator 20 via the decelerator 50 and the power split mechanism 30. In this manner, the second motor generator 20 generates electric power during the regenerative braking.

The PCU 200 converts the DC electric power that is stored in the battery 250 into AC electric power and supplies the AC electric power to the first motor generator 10 and the second motor generator 20. In addition, the PCU 200 converts the AC electric power that is generated by the first motor generator 10 and the second motor generator 20 into DC electric power and supplies the DC electric power to the battery 250. The PCU 200 is controlled in accordance with a control signal S2 from the ECU 300.

The battery 250 is an electric power storage device that is configured to be rechargeable. For example, a secondary battery such as a nickel-hydrogen battery and a lithium-ion battery or a capacitor such as an electric double layer capacitor can be adopted as the battery 250.

A battery sensor 252 is disposed in the battery 250. The battery sensor 252 comprehensively refers to a current sensor, a voltage sensor, and a temperature sensor (none of which is illustrated herein). The voltage sensor detects the voltage (battery voltage) VB of the battery 250. The current sensor detects the current (input and output current) IB input into and output from the battery 250. The temperature sensor detects the temperature (battery temperature) TB of the battery 250. Each of the sensors outputs the result of the detection to the ECU 300. The ECU 300 computes the state of charge (SOC) of the battery 250 based on the battery voltage VB, the input and output current IB, and the battery temperature TB of the battery 250.

The shutter 60 is disposed in a front grille of the vehicle 1. The configuration of the shutter 60 will be described later.

The radiator 70 dissipates the heat of a coolant for cooling the engine 100, the first motor generator 10, and the second motor generator 20. In FIG. 1, the radiator for the engine 100 and the radiator for the first motor generator 10 and the second motor generator 20 are illustrated as integrally configured as the radiator 70. However, the radiator for the engine 100 and the radiator for the first motor generator 10 and the second motor generator 20 may be configured separately.

A water temperature sensor 72 is disposed in a cooling system (not illustrated) of the engine 100. The water temperature sensor 72 detects the temperature (coolant temperature) Tw of the coolant flowing through the cooling system and outputs the result of the detection to the ECU 300. The ECU 300 executes opening and closing control for the shutter 60 based on the coolant temperature Tw. For example, the ECU 300 opens the shutter 60 in a case where the engine temperature is high (for example, in a case where the coolant temperature Tw exceeds a predetermined value) and closes the shutter 60 in a case where the engine temperature is low (in a case where the coolant temperature Tw does not exceed the predetermined value).

A rotation sensor 352 is disposed in a hub or a knuckle (not illustrated) of the driving wheel 350. The rotation sensor 352 detects the rotation speed Nw of the driving wheel 350 and outputs the result of the detection to the ECU 300. The ECU 300 calculates the vehicle speed V of the vehicle 1 based on the rotation speed Nw of the driving wheel 350 and executes the opening and closing control for the shutter 60 based on the vehicle speed V. For example, the ECU 300 opens the shutter 60 in a case where the vehicle speed V does not exceed a predetermined value and closes the shutter 60 in a case where the vehicle speed V exceeds the predetermined value. In addition, the opening and closing control for the shutter 60 that is performed by the ECU 300 includes control for performing the adjustment of the opening degree of the shutter 60 (shutter opening).

A pedal stroke sensor 162 is disposed in an accelerator pedal 160. The pedal stroke sensor 162 detects the amount of stroke (amount of depression) AP on the accelerator pedal 160 that is performed by a user and outputs the result of the detection to the ECU 300. The ECU 300 calculates the degree of accelerator opening based on the stroke amount AP and calculates a required driving force of the vehicle 1 from the degree of accelerator opening. The calculation method will be described later.

The vehicle 1 is also provided with an air-conditioning device 400 for performing air-conditioning in the passenger compartment of the vehicle 1 by using the electric power stored in the battery 250 and an operation panel 410 for allowing the user to select the driving/stopping of the air-conditioning device 400, the heating operation/cooling operation of the air-conditioning device 400, a preset temperature, and the like. The operation panel 410 outputs an air-conditioning request REQ to the ECU 300 in response to the user's operation of the operation panel 410. The ECU 300 controls the air-conditioning device 400 based on the air-conditioning request REQ.

The ECU 300 includes a central processing unit (CPU), a memory, and a buffer (none of which is illustrated herein). The ECU 300 controls equipment, based on the signals sent from the respective sensors and a map and a program stored in the memory, so that the vehicle 1 is in a desired state.

Figure 2:
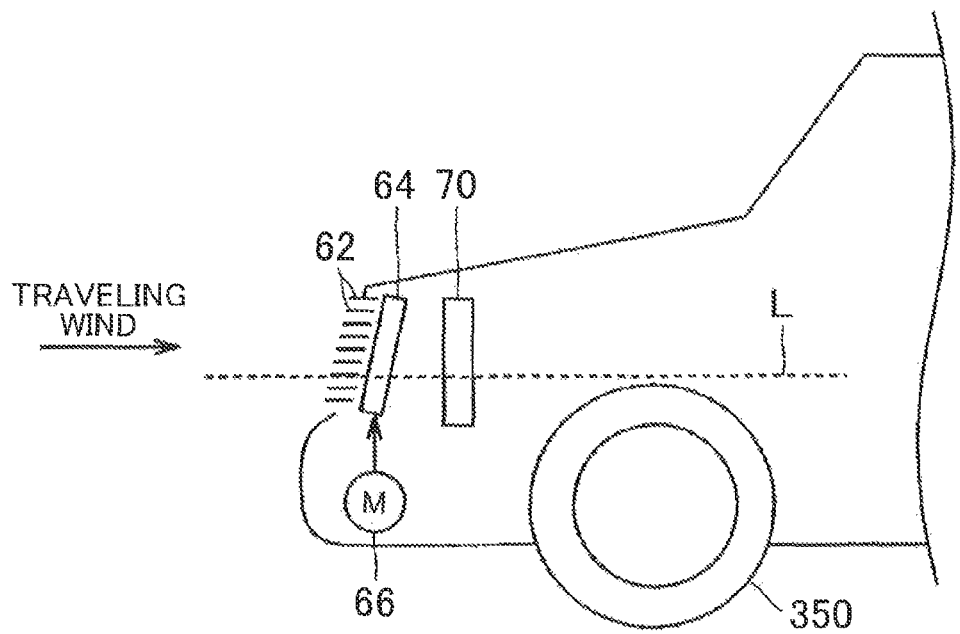
FIG. 2 is a cross-sectional view of the vehicle schematically illustrating the configuration of the shutter that is illustrated in FIG. 1.

FIG. 2 is a cross-sectional view of the vehicle schematically illustrating the configuration of the shutter 60 that is illustrated in FIG. 1. Referring to FIG. 2, the shutter 60 includes a plurality of fins 62, a rotating mechanism 64 that allows the plurality of fins 62 to rotate in conjunction with each other, and a motor 66 as a driving source for the rotating mechanism 64. The motor 66 is driven based on control by the ECU 300. The shutter 60 is configured for the opening degree (for example, the angle that is formed by a traveling direction L of the vehicle 1 and the respective fins 62) to be adjustable by the driving of the motor 66. During the traveling of the vehicle 1, air is introduced into the vehicle from the outside of the vehicle with the amount of the introduced air depending on the opening degree.

<Traveling Mode>

The ECU 300 is configured to allow the switching of traveling modes, which include a charge depleting (CD) mode and a charge sustaining (CS) mode.

Figure 3:
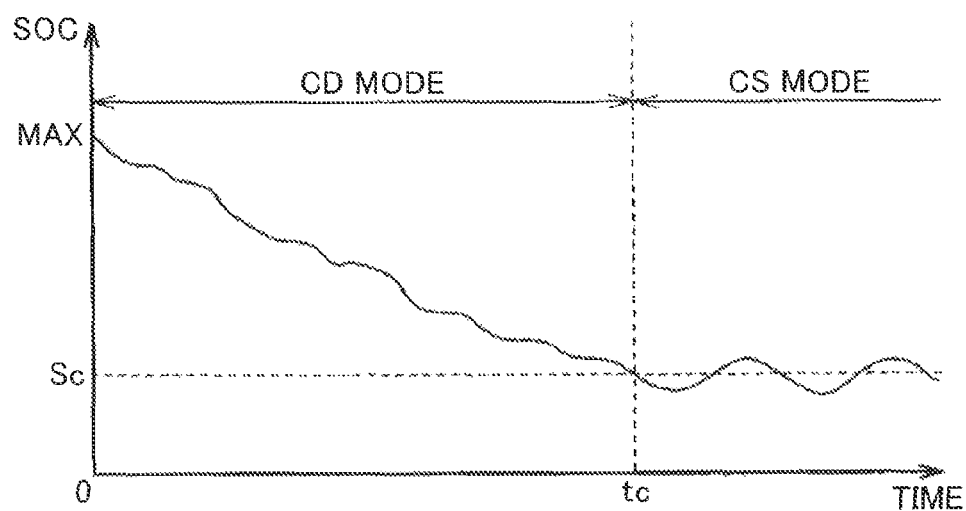
FIG. 3 is a diagram for showing a CS mode and a CD mode.

FIG. 3 is a diagram for showing the CS mode and the CD mode. The horizontal axis that is illustrated in FIG. 3 represents elapsed time and the vertical axis that is illustrated in FIG. 3 represents the SOC of the battery 250.

Referring to FIG. 3, the battery 250 is in a fully-charged state (SOC=MAX) at the time of initiation (0) and the CD mode is selected as the traveling mode. Basically, the CD mode is a mode in which the electric power that is stored in the battery 250 is consumed. During the traveling in the CD mode, engine start for the purpose of maintaining the SOC is not performed.

The CS mode is a mode in which the SOC is maintained at a predetermined value Sc (or within a predetermined range). As illustrated in FIG. 3, the traveling mode is switched from the CD mode to the CS mode when the SOC is reduced to the predetermined value Sc at time tc. Then, the SOC is maintained in the vicinity of the predetermined value Sc. In the CS mode, the engine 100 is driven so as to maintain the SOC in this manner.

The CD mode is not limited to EV traveling during which the engine 100 remains stopped and the traveling is performed by the second motor generator 20. In addition, the CS mode is not limited to HV traveling during which the traveling is performed by the continuous driving of the engine 100. The EV traveling and the HV traveling can be executed in both the CD mode and the CS mode. In addition, the vehicle 1 having the CD mode and the CS mode is not an essential configuration in the first embodiment and the second and third embodiments which will be described later.

<Malfunctioning State of Shutter>

In some cases, a malfunctioning state (closing failure) of the shutter 60 occurs where it is impossible for the shutter 60 to be in an open state and the shutter 60 is stuck in a closed state due to a factor such as an impact from the outside of the vehicle. When the malfunctioning state (closing failure) occurs, air cannot be introduced into the vehicle from the outside of the vehicle, and thus the temperature of the engine 100 becomes likely to rise. As a result, an excessive temperature rise ensues and the engine 100 may be, for example, overheated. The malfunctioning state described herein includes not only a fully-closed state where the shutter is stuck in the closed state but also a state where the shutter cannot be opened to reach a predetermined opening degree for introducing the amount of the air required for cooling.

The starting of the engine 100 is suppressed in a case where the shutter 60 is in the malfunctioning state, compared to a case where the shutter 60 is not in the malfunctioning state, according to this embodiment. Then, the EV traveling in a state where the engine 100 is stopped becomes likely to be performed. As a result, a rise in the temperature of the engine 100 can be suppressed and an excessive rise in the temperature of the engine 100 can be prevented.

Hereinafter, the implementation of control for suppressing engine start in a case where the shutter 60 is in the malfunctioning state will be described in detail. The ECU 300 holds, in the memory (not illustrated), a map for calculating the required driving force of the vehicle 1 based on the degree of accelerator opening.

Figure 4:
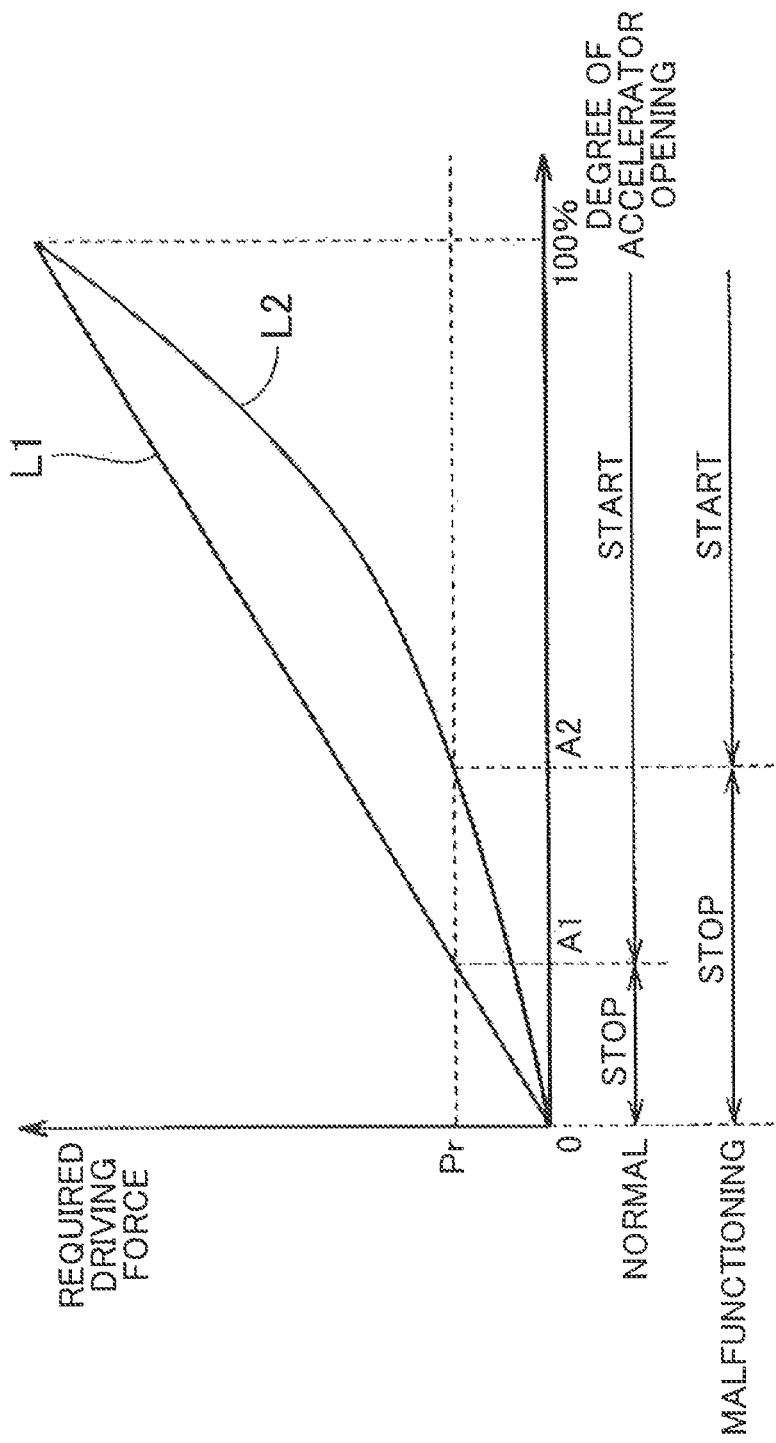
FIG. 4 is a diagram illustrating an example of a map for calculating a required driving force of the vehicle based on the degree of accelerator opening according to the first embodiment.

FIG. 4 is a diagram illustrating an example of the map for calculating the required driving force of the vehicle 1 based on the degree of accelerator opening according to the first embodiment. The horizontal axis that is illustrated in FIG. 4 represents the degree of accelerator opening and the vertical axis that is illustrated in FIG. 4 represents the required driving force of the vehicle 1.

Referring to FIG. 4, the ECU 300 starts the engine 100 in a case where the required driving force is equal to or greater than a predetermined start threshold Pr whether the traveling mode is the CD mode or the CS mode. In a case where the shutter 60 is not in the malfunctioning state (that is, when the shutter 60 is in a normal state), the required driving force is defined to be proportional to the degree of accelerator opening as illustrated by, for example, the curve L1. The ECU 300 starts the engine 100 in a case where the degree of accelerator opening becomes equal to or greater than A1 according to the curve L1.

When the malfunctioning state of the shutter 60 is detected, the required driving force with respect to the same degree of accelerator opening is set to be smaller, as illustrated by the curve L2, than in a case where the shutter 60 is not in the malfunctioning state. The ECU 300 starts the engine 100 in a case where the degree of accelerator opening becomes equal to or greater than A2, which exceeds A1, according to the curve L2.

As described above, the required driving force with respect to the same degree of accelerator opening is set to be smaller in a case where the shutter 60 is in the malfunctioning state than in a case where the shutter 60 is not in the malfunctioning state, and thus the required driving force becomes less likely to exceed the start threshold Pr. Accordingly, the suppression of engine start in the event of the detection of the malfunctioning state of the shutter 60 can be realized.

Figure 5:
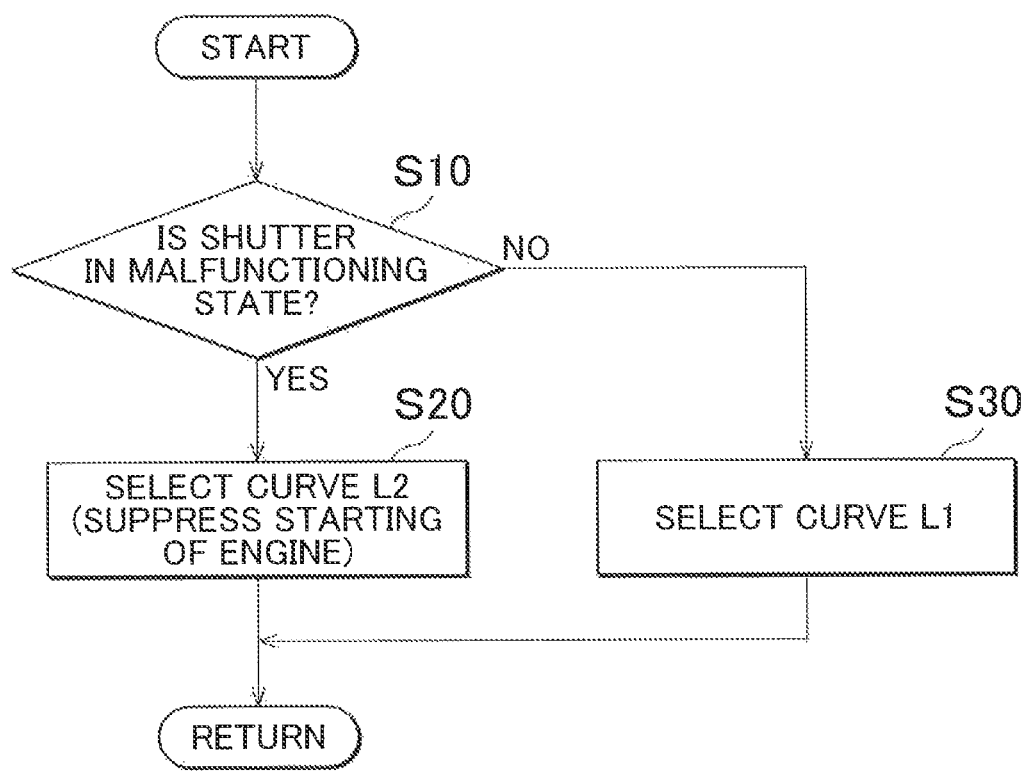
FIG. 5 is a flowchart for showing engine start suppression control according to the first embodiment.

FIG. 5 is a flowchart for showing the engine start suppression control according to the first embodiment. The flowcharts that are illustrated in FIG. 5 and FIGS. 7, 8, and 10, which will be described later, are executed, called from the main routine, when a predetermined condition is satisfied or each time a predetermined period of time elapses. Basically, each step in the flowcharts is realized by software processing by the ECU 300. However, each step in the flowcharts may be realized by manufactured hardware (electronic circuit) in the ECU 300.

Referring to FIGS. 4 and 5, the ECU 300 determines in Step (hereinafter, simply referred to as S) 10 whether or not the malfunctioning state of the shutter 60 has occurred. An example of the method for detecting the malfunctioning state of the shutter 60 will be described below.

A pulse output unit (not illustrated) that outputs a pulse signal in synchronization with the rotation of the motor 66 is disposed in the motor 66 (refer to FIG. 2). The ECU 300 calculates the amount of rotation of the motor 66 by counting the pulse signal and calculates the opening degree of the shutter 60 based on the amount of rotation of the motor 66. According to this configuration, the ECU 300 can determine that the shutter 60 is in the malfunctioning state in a case where no pulse signal is output from the pulse output unit despite the output of a drive signal from the ECU 300 to the motor 66 in the closed state of the shutter 60. In addition, the ICU 300 can determine a state where the opening degree of the shutter is short of a predetermined opening degree. Still, the above-described configuration is merely an example, and the method for detecting the malfunctioning state is not limited thereto.

In a case where the shutter 60 is not in the malfunctioning state (NO in S10), the ECU 300 allows the processing to proceed to S30. When the shutter 60 is in the normal state, air can be introduced into the vehicle with the shutter 60 being in the open state, and thus the ECU 300 determines that the necessity of suppressing the starting of the engine 100 is relatively low in S30 and selects the curve L1.

In a case where the shutter 60 is in the malfunctioning state (YES in S10), the ECU 300 allows the processing to proceed to S20. When the malfunctioning of the shutter 60 has occurred, a rise in the temperature of the engine 100 is likely to occur. Accordingly, the ECU 300 determines that the necessity of suppressing the starting of the engine 100 is relatively high in S20 and selects the curve L2. In other words, the ECU 300 suppresses the starting of the engine 100.

According to the first embodiment, the required driving force with respect to the same degree of accelerator opening is set to be smaller in a case where the shutter 60 is in the malfunctioning state than in a case where the shutter 60 is not in the malfunctioning state as described above. Accordingly, the required driving force of the vehicle 1 becomes less likely to exceed the start threshold Pr, and thus the starting of the engine 100 can be suppressed. As a result, a rise in the temperature of the engine 100 can be suppressed and an excessive rise in the temperature of the engine 100 can be prevented.

Second Embodiment

The method for suppressing the starting of the engine when the malfunctioning of the shutter is detected is not limited to what has been described in the first embodiment. In a second embodiment, a configuration will be described in which a threshold of the required driving force for starting the engine is set to be greater in a case where the shutter is in the malfunctioning state than in a case where the shutter is not in the malfunctioning state. The configuration of the vehicle according to the second embodiment is identical to the configuration of the vehicle 1 illustrated in FIG. 1, and thus detailed description thereof will not be repeated.

Figure 6:
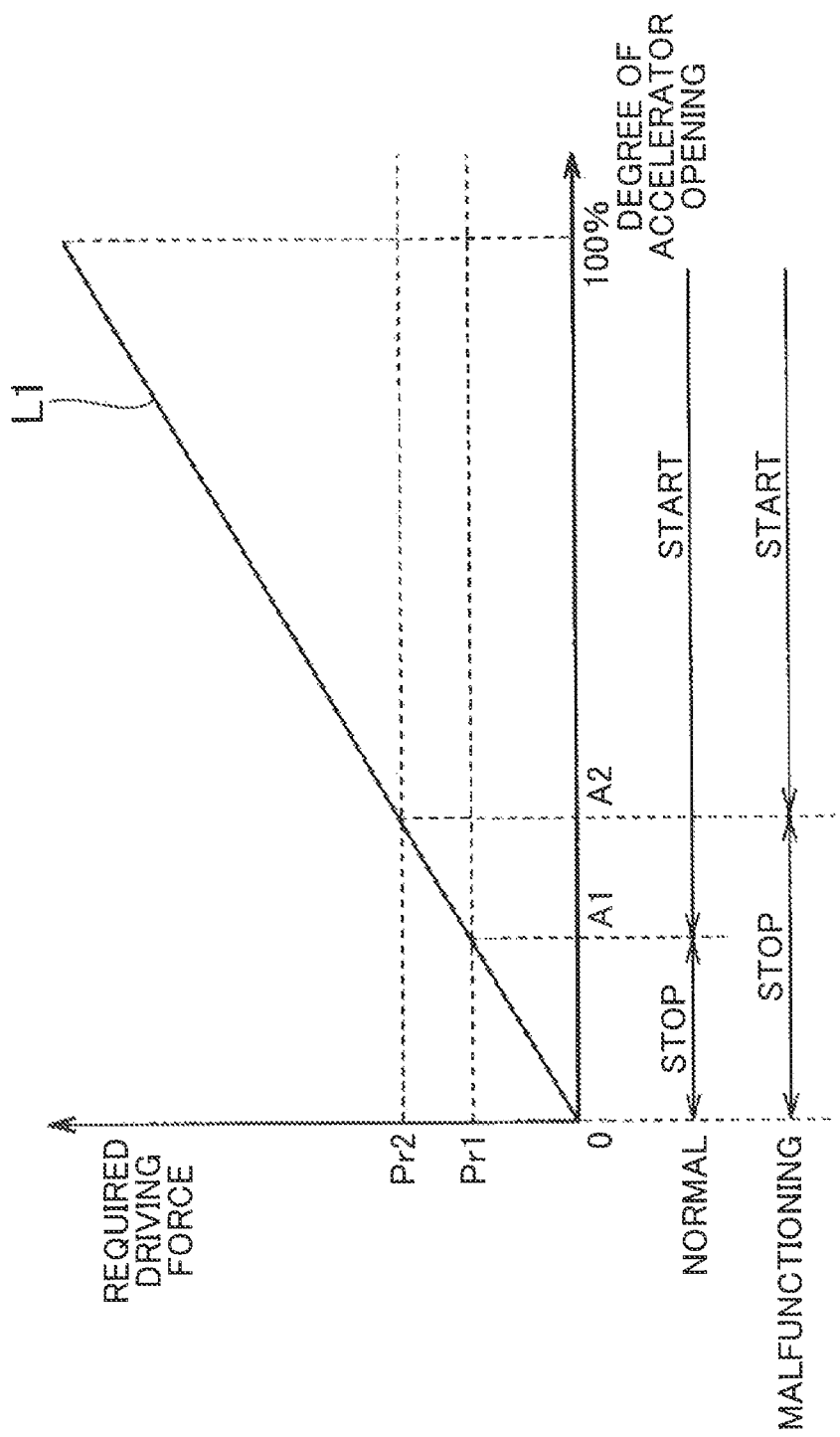
FIG. 6 is a diagram illustrating an example of a map for calculating a required driving force of a vehicle based on the degree of accelerator opening according to a second embodiment.

FIG. 6 is a diagram illustrating an example of a map for calculating the required driving force of the vehicle 1 based on the degree of accelerator opening according to the second embodiment. The horizontal axis, the vertical axis, and the curve L1 that are illustrated in FIG. 6 are identical to what have been described with reference to the map illustrated in FIG. 4, and thus detailed description thereof will not be repeated.

Referring to FIG. 6, the ECU 300 sets Pr1 as a start threshold of the required driving force for starting the engine 100 in a case where the shutter 60 is not in the malfunctioning state (that is, when the shutter 60 is in the normal state). Accordingly, the ECU 300 starts the engine 100 in a case where the degree of accelerator opening becomes equal to or greater than A1.

When the malfunctioning state of the shutter 60 is detected, the ECU 300 sets Pr2, which exceeds Pr1, as a start threshold of the required driving force. Accordingly, the ECU 300 starts the engine 100 in a case where the degree of accelerator opening becomes equal to or greater than A2 that exceeds A1.

As described above, the start threshold of the required driving force for starting the engine 100 is set to be greater in a case where the shutter 60 is in the malfunctioning state than in a case where the shutter 60 is not in the malfunctioning state. Accordingly, the required driving force becomes less likely to exceed the start threshold. As a result, the suppression of engine start in the event of the detection of the malfunctioning state of the shutter 60 can be realized.

Figure 7:
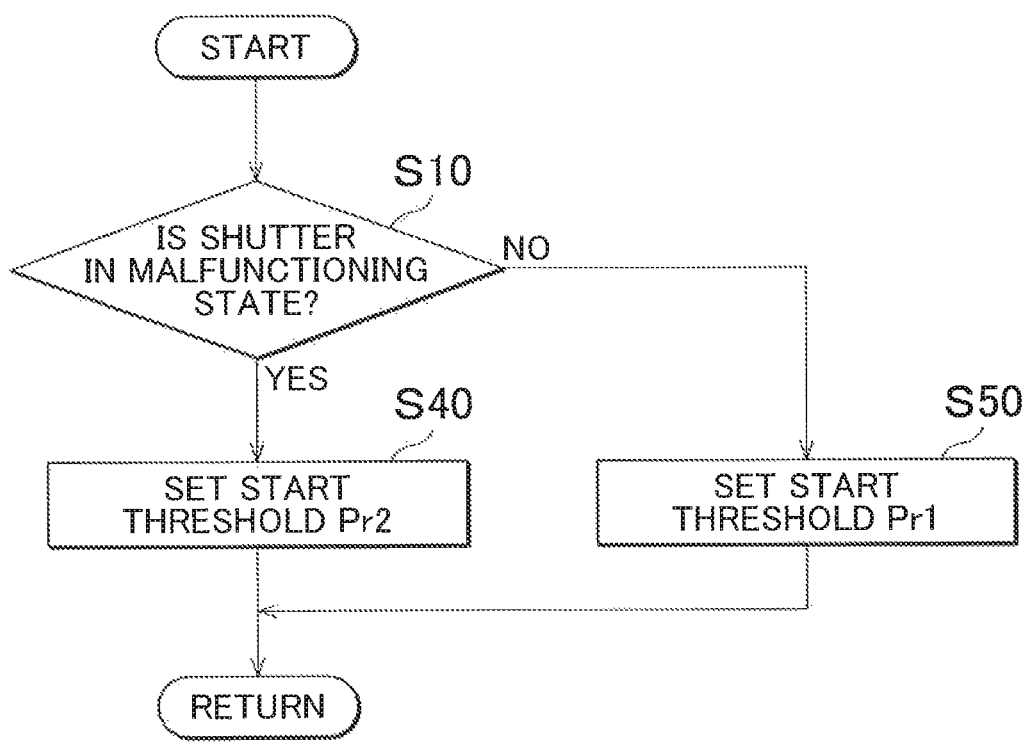
FIG. 7 is a flowchart for showing engine start suppression control according to the second embodiment.

FIG. 7 is a flowchart for showing the engine start suppression control according to the second embodiment. Referring to FIGS. 6 and 7, the ECU 300 determines in S10 whether or not the malfunctioning state of the shutter 60 has occurred. The method for detecting the malfunctioning state is identical to what has been described in the first embodiment, and thus detailed description thereof will not be repeated.

In a case where the shutter 60 is not in the malfunctioning state (NO in S10), the ECU 300 allows the processing to proceed to S50. When the shutter 60 is in the normal state, air can be introduced into the vehicle with the shutter 60 being in the open state, and thus the ECU 300 determines that the necessity of suppressing the starting of the engine 100 is relatively low in S50 and sets the start threshold to Pr1.

In a case where the shutter 60 is in the malfunctioning state (YES in S10), the ECU 300 allows the processing to proceed to S40. When the malfunctioning state of the shutter 60 has occurred, a rise in the temperature of the engine 100 is likely to occur. Accordingly, the ECU 300 determines that the necessity of suppressing the starting of the engine 100 is relatively high in S40 and sets the start threshold Pr2 that exceeds Pr1. In other words, the ECU 300 suppresses the starting of the engine 100.

According to the second embodiment, the start threshold of the required driving force is set to be greater in a case where the malfunctioning state of the shutter 60 has occurred than in a case where the malfunctioning state of the shutter 60 has not occurred as described above. Accordingly, the required driving force becomes less likely to exceed the start threshold, and thus the starting of the engine 100 can be suppressed. As a result, a rise in the temperature of the engine 100 can be suppressed and an excessive rise in the temperature of the engine 100 can be prevented.

Third Embodiment

Electric power is supplied from the battery to the air-conditioning device during the driving of the air-conditioning device, and thus the electric power that can be supplied from the battery to the second motor generator is decreased by the same amount as the electric power that is supplied from the battery to the air-conditioning device. Accordingly, the driving force that can be output from the second motor generator may be decreased. As a result, the engine is started in a case where the driving force from the second motor generator is short of a required driving amount of the vehicle. As described above, the engine becomes more likely to be started when the air-conditioning device is driven. In a third embodiment, a configuration will be described in which the starting of the engine is suppressed by suppressing (for example, prohibiting) the driving of the air-conditioning device in a case where the shutter is in the malfunctioning state. The configuration of the vehicle according to the third embodiment is identical to the configuration of the vehicle 1 illustrated in FIG. 1, and thus detailed description thereof will not be repeated.

Figure 8:
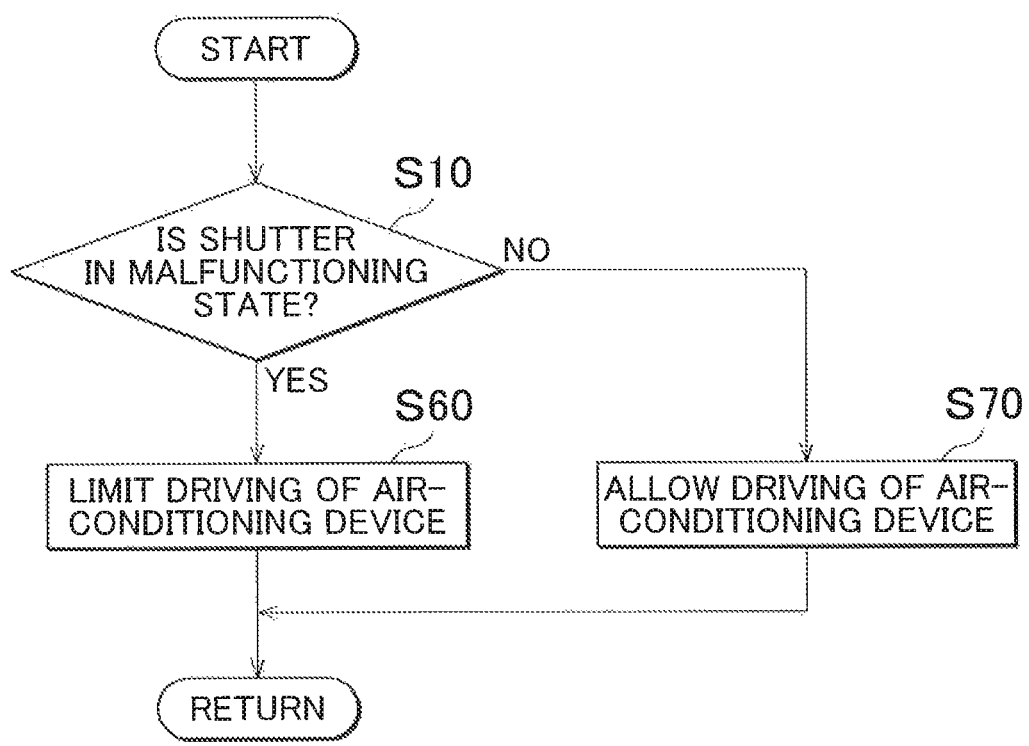
FIG. 8 is a flowchart for showing engine start suppression control according to a third embodiment.

FIG. 8 is a flowchart for showing the engine start suppression control according to the third embodiment. Referring to FIG. 8, the ECU 300 determines in S10 whether or not the malfunctioning state of the shutter 60 has occurred. The method for detecting the malfunctioning state is identical to what has been described in the first embodiment, and thus detailed description thereof will not be repeated.

In a case where the shutter 60 is not in the malfunctioning state (NO in S10), the ECU 300 allows the processing to proceed to S70. When the shutter 60 is in the normal state, the engine 100 can be cooled with the shutter 60 being in the open state even in a case where the driving of the air-conditioning device 400 causes the driving force that can be output from the second motor generator 20 to be decreased and the engine 100 to be started. Accordingly, the ECU 300 determines that the necessity of suppressing the starting of the engine 100 is relatively low in S70 and allows the driving of the air-conditioning device 400.

In a case where the shutter 60 is in the malfunctioning state (YES in S10), the ECU 300 allows the processing to proceed to S60. When the shutter 60 is in the malfunctioning state, it is impossible to cool the engine 100 by using the air introduced from the outside of the vehicle in a case where the driving of the air-conditioning device 400 causes the driving force that can be output from the second motor generator 20 to be decreased and the engine 100 to be started. Accordingly, the ECU 300 determines that the necessity of suppressing the starting of the engine 100 is relatively high in S60 and limits the driving of the air-conditioning device 400.

The driving of the air-conditioning device 400 can be prohibited as an example of the limitation of the driving of the air-conditioning device 400. As an example, the ECU 300 can maintain a state where the air-conditioning device 400 is stopped even in a case where the air-conditioning request REQ that shows a driving instruction for the air-conditioning device 400 is received from the operation panel 410. Alternatively, the ECU 300 may drive the air-conditioning device 400 in a state where the electric power consumption by the air-conditioning device 400 is smaller (for example, weak operation) in a case where the shutter 60 is in the malfunctioning state than in a case where the shutter 60 is not in the malfunctioning state.

According to the third embodiment, the driving of the air-conditioning device 400 is limited in a case where the shutter 60 is in the malfunctioning state, compared to a case where the shutter 60 is not in the malfunctioning state, as described above. Accordingly, the electric power consumption by the air-conditioning device 400 can be reduced, and thus the shortage of the electric power supplied to the second motor generator 20 becomes less likely to occur. Accordingly, the starting of the engine 100 can be suppressed. As a result, a rise in the temperature of the engine 100 can be suppressed and an excessive rise in the temperature of the engine 100 can be prevented.

A configuration has been described in which the passenger compartment is heated by using the air-conditioning device 400 that consumes the electric power of the battery 250. However, a fourth embodiment can also be applied to a configuration in which the engine 100 is warmed up in response to a heating request and the heating is performed by using the heat of the engine 100. Even in this configuration, a rise in the temperature of the engine 100 can be suppressed by suppressing the warm-up of the engine 100, and thus an excessive rise in the temperature of the engine 100 can be prevented.

Fourth Embodiment

In the hybrid vehicle that has the CD mode and the CS mode, the EV traveling is mainly performed in the CD mode. Accordingly, the starting of the engine can be suppressed when the CD mode is maintained for as long as possible. In the fourth embodiment, a configuration will be described in which the period of traveling in the CD mode is extended by setting a lower threshold for the switching of the traveling mode from the CD) mode to the CS mode in a case where the malfunctioning has occurred in the shutter than in a case where no malfunctioning has occurred in the shutter. The configuration of the vehicle according to the fourth embodiment is identical to the configuration of the vehicle 1 illustrated in FIG. 1, and thus detailed description thereof will not be repeated.

Figure 9:
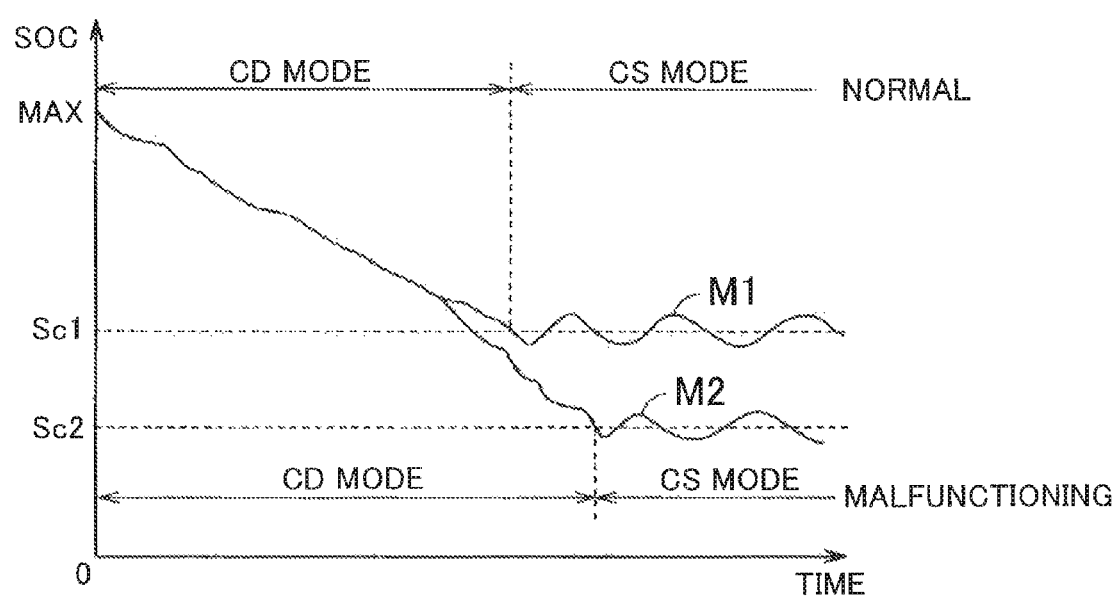
FIG. 9 is a diagram for showing control for setting a threshold for switching traveling modes in accordance with whether or not a malfunctioning state of a shutter has occurred according to the third embodiment.

FIG. 9 is a diagram for showing the control for setting the threshold (control center value) for switching the traveling modes in accordance with whether or not the malfunctioning of the shutter 60 has occurred according to the fourth embodiment. As in FIG. 3, the horizontal axis that is illustrated in FIG. 9 represents elapsed time and the vertical axis that is illustrated in FIG. 9 represents the SOC of the battery 250.

Referring to FIG. 9, the battery 250 is in the fully-charged state (SOC=MAX) at the time of initiation (0) and the CD mode is selected as the traveling mode. In a case where the shutter 60 is not in the malfunctioning state, the ECU 300 switches the traveling mode from the CD mode to the CS mode at the point in time when the SOC is exceeded by a control center value Sc1 as illustrated by the curve M1. Then, the ECU 300 controls the engine 100 in the CS mode so that the SOC is maintained at the control center value Sc1. In other words, the ECU 300 starts the engine 100 when the control center value Sc1 exceeds the SOC by a margin of a predetermined value and stops the engine 100 when the SOC exceeds the control center value Sc1 by a margin of a predetermined value.

In a case where the malfunctioning state of the shutter 60 has occurred, the ECU 300 sets Sc2, which is exceeded by Sc1, as the control center value. Then, the ECU 300 switches the traveling mode from the CD mode to the CS mode at the point in time when the SOC is exceeded by the control center value Sc2 as illustrated by the curve M2. Then, the ECU 300 controls the engine 100 so that the SOC is maintained at the control center value Sc2.

As described above, the control center value is set to Sc2, which is exceeded by Sc1, in a case where the malfunctioning state of the shutter 60 has occurred, and thus the period of traveling in the CD mode can be extended by the period during which the SOC is reduced from Sc1 to Sc2. In the CD mode, engine start for the purpose of maintaining the SOC is not performed, and thus the starting of the engine 100 can be suppressed.

Figure 10:
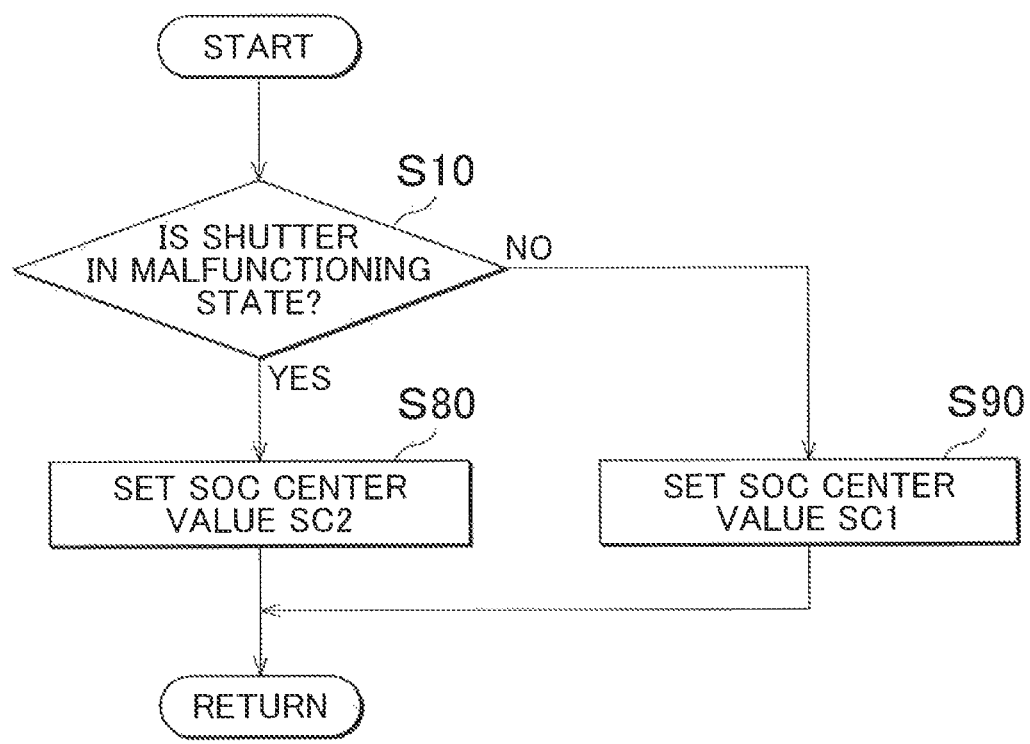
FIG. 10 is a flowchart for showing engine start suppression control according to a fourth embodiment.

FIG. 10 is a flowchart for showing the engine start suppression control according to the fourth embodiment. Referring to FIG. 10, the ECU 300 determines in S10 whether or not the malfunctioning of the shutter 60 has occurred. The method for detecting the malfunctioning is identical to what has been described in the first embodiment, and thus detailed description thereof will not be repeated.

In a case where the shutter 60 is not in the malfunctioning state (NO in S10), the ECU 300 allows the processing to proceed to S90. In S90, air can be introduced into the vehicle with the shutter 60 being in the open state, and thus the ECU 300 determines that the necessity of suppressing the starting of the engine 100 is relatively low and sets the control center value Sc1.

In a case where the shutter 60 is in the malfunctioning state (YES in S10), the ECU 300 allows the processing to proceed to 880. In S80, the occurrence of the closing failure of the shutter 60 is likely to result in a rise in the temperature of the engine 100, and thus the ECU 300 determines that the necessity of suppressing the starting of the engine 100 is relatively high and sets the control center value Sc2 that is exceeded by Sc1. In other words, the ECU 300 suppresses the starting of the engine 100.

According to the fourth embodiment, the control center value of the SOC is set to be smaller in a case where the shutter 60 is in the malfunctioning state than in a case where the shutter 60 is not in the malfunctioning state as described above. Accordingly, the period of traveling in the CD mode can be extended. In the CD mode, engine start for the purpose of maintaining the SOC is not performed and the EV traveling is mainly performed, and thus the starting of the engine 100 can be suppressed by extending the period of traveling in the CD mode. As a result, a rise in the temperature of the engine 100 can be suppressed and an excessive rise in the temperature of the engine 100 can be prevented.

In the above description, a configuration has been described in which the vehicle 1 has both the CD mode and the CS mode. However, the invention can also be applied to a vehicle that has only the CS mode. In other words, in the CS mode, the control center value is set to be smaller in a case where the shutter 60 is in the malfunctioning state than in a case where the shutter 60 is not in the malfunctioning state. Even in the CS mode, engine start for maintaining the SOC is not performed in a period during which the SOC is reduced from an initial value (value at a certain time) to the control center value, and thus the starting of the engine 100 can be suppressed. As a result, a rise in the temperature of the engine 100 can be suppressed and an excessive rise in the temperature of the engine 100 can be prevented.

It should be noted that the embodiment disclosed herein is exemplary in every aspect and does not limit the invention. The scope of the invention is clarified by the claims, not the description above, and the invention includes any change within the meaning and range equivalent to the claims.

What is claimed is:

1. A hybrid vehicle comprising:
   an internal combustion engine;
   an electric power storage device;
   an electric motor configured to generate driving force by electric power stored in the electric power storage device;
   a shutter configured to be capable of being opened in accordance with a control for opening the shutter, the shutter being configured to introduce air into an engine compartment of the hybrid vehicle from outside the hybrid vehicle during traveling of the hybrid vehicle in a state where the shutter is open; and
   an electronic control unit configured to control the internal combustion engine, the electric motor and the shutter, the electronic control unit being configured to control the hybrid vehicle such that starting of the internal combustion engine is more suppressed in a case where the shutter is in a malfunctioning state than in a case where the shutter is not in the malfunctioning state, and the malfunctioning state being a closing failure in which the shutter is stuck in a closed state in response to the control demand.

2. The hybrid vehicle according to claim 1,
   wherein the electronic control unit is configured to control the hybrid vehicle such that traveling by the electric motor is more likely to be performed in a case where the shutter is in the malfunctioning state than in a case where the shutter is not in the malfunctioning state.

3. The hybrid vehicle according to claim 1,
   wherein the electronic control unit is configured to control the hybrid vehicle such that EV traveling is more likely to be performed in a case where the shutter is in the malfunctioning state than in a case where the shutter is not in the malfunctioning state, and
   during the EV traveling, the internal combustion engine is stopped.

4. The hybrid vehicle according to claim 1,
   wherein the electronic control unit is configured to calculate a required driving force of the hybrid vehicle based on a degree of accelerator opening,
   the electronic control unit is configured to start the internal combustion engine in a case where the calculated required driving force exceeds a predetermined threshold, and the required driving force with respect to the degree of accelerator opening in a case where the shutter is in the malfunctioning state is set to be smaller than the required driving force with respect to the degree of accelerator opening in a case where the shutter is not in the malfunctioning state.

5. The hybrid vehicle according to claim 1,
wherein the electronic control unit is configured to calculate a required driving force of the hybrid vehicle based on a degree of accelerator opening,
the electronic control unit is configured to start the internal combustion engine in a case where the calculated required driving force of the hybrid vehicle exceeds a predetermined threshold, and
the predetermined threshold is set to be larger in a case where the shutter is in the malfunctioning state than in a case where the shutter is not in the malfunctioning state.

6. The hybrid vehicle according to claim 1, further comprising an air-conditioner,
wherein the electronic control unit is configured to control the air-conditioner such that driving of the air-conditioner is more limited in a case where the shutter is in the malfunctioning state than in a case where the shutter is not in the malfunctioning state.

7. The hybrid vehicle according to claim 6, wherein the air-conditioner is configured to condition air in a passenger compartment of the hybrid vehicle by electric power stored in the electric power storage device.

8. The hybrid vehicle according to claim 6, wherein the air-conditioner is configured to heat a passenger compartment of the hybrid vehicle by heat of the internal combustion engine.

9. The hybrid vehicle according to claim 1,
wherein the electronic control unit is configured to switch a traveling mode,
the traveling mode includes a charge depleting mode and a charge sustaining mode,
the charge depleting mode is a mode in which a state of charge of the electric power storage device is consumed,
the charge sustaining mode is a mode in which the state of charge is maintained at a predetermined value, and
the electronic control unit is configured to control the hybrid vehicle such that switching of the traveling mode from the charge depleting mode to the charge sustaining mode is more suppressed in a case where the shutter is in the malfunctioning state than in a case where the shutter is not in the malfunctioning state.

10. A control method for a hybrid vehicle,
the hybrid vehicle including:
    an internal combustion engine;
    an electric power storage device;
    an electric motor configured to generate driving force by electric power stored in the electric power storage device;
    a shutter configured to be capable of being opened in accordance with a control demand for opening the shutter, the shutter being configured to introduce air into an engine compartment of the hybrid vehicle from outside the hybrid vehicle during traveling of the hybrid vehicle in a state where the shutter is open; and
    an electronic control unit configured to control the internal combustion engine, the electric motor, and the shutter,
the control method comprising:
    determining, by the electronic control unit, whether an opening degree of the shutter reaches a predetermined opening degree; and
    suppressing, by the electronic control unit, starting of the internal combustion engine in a case where the shutter is in a malfunctioning state more than in a case where the shutter is not in the malfunctioning state, the malfunctioning state being a closing failure in which the shutter is stuck in a closed state in response to the control demand.

* * * * *